United States Patent

[11] 3,583,105

| [72] | Inventor | George Popp |
| | | 1304 Alfred Drive, Orlando, Fla. 32810 |
| [21] | Appl. No. | 746,862 |
| [22] | Filed | July 23, 1968 |
| [45] | Patented | June 8, 1971 |

[54] APPARATUS FOR CUTTING GROOVES IN VEHICLE TIRES
6 Claims, 2 Drawing Figs.

[52] U.S. Cl. .................................................. 51/104,
51/179, 157/13
[51] Int. Cl. .................................................. B24b 5/18
[50] Field of Search ..................................... 51/104,
106, 179, 258; 157/13

[56] References Cited
UNITED STATES PATENTS

| 1,400,971 | 12/1921 | Nye | 51/258UX |
| 1,567,472 | 12/1925 | Skiles | 157/13 |
| 2,649,665 | 8/1953 | Anderson et al. | 51/179X |
| 2,651,893 | 9/1953 | Braley | 51/104X |
| 2,765,845 | 10/1956 | Bullis | 157/13 |
| 2,810,238 | 10/1957 | Yoho et al. | 51/106 |
| 2,897,882 | 8/1959 | Barrett | 157/13 |
| 3,218,208 | 11/1965 | Molen | 157/13X |

*Primary Examiner*—Lester M. Swingle
*Attorneys*—William M. Hobby and Robert W. Duckworth ABSTRACT: An apparatus for adding white or red sidewalls, or the like, to vehicle tires while the tires remain on the vehicle. One or more power operated rollers are attached to a frame and when placed against a vehicle tire that has been lifted for independent rotation will rotate the tire and a cutting wheel, or the like, which is connected to a motor by a flexible shaft attached to an adjustable holding device on the frame so that the cutting wheel may be placed against the tire and clamped for cutting an an annular groove in the side of the tire. The groove may then be filled with a material such as liquid rubber.

PATENTED JUN 8 1971 3,583,105

INVENTOR.
George Popp
BY
William M. Hobby
Attorney

APPARATUS FOR CUTTING GROOVES IN VEHICLE TIRES

BACKGROUND OF THE INVENTION

1. Field of the Invention

The present invention relates to an apparatus for adding white sidewalls to tires while the tires remain on the vehicle. Red walls, blue walls or any other color may also be added as desired.

2. Description of the Prior Art

The usual prior way to obtain white wall tires and the like has been during manufacture of the tires. However, it has also been suggested to remove the tires from the automobile and place them on a relative complex device for rotating the tire while cutting a groove in the side of the tire and then to fill the groove with a liquid rubber of the desired color and finally buffing the colored strip. While this system has worked satisfactorily in the past, it requires expensive and bulky type devices and requires a great amount of extra labor in removing the tire and wheel from the vehicle, putting the white wall on the tire and replacing the wheel. My invention eliminates the need to remove the tire and wheel from the vehicle, thus reducing the labor required and substantially reducing the time needed to add the new colored sidewall. My device is also small and easily portable and may be taken by hand to the worksite.

SUMMARY OF THE INVENTION

I provide an apparatus for use in adding white sidewalls, and the like, to a vehicle tire while the tire remains on the vehicle and having a frame with one or two electric motors attached thereto. A rotating roller is connected to one motor so that when pushed against a tire that is slightly lifted off the ground the roller will cause the tire to rotate. A rotating cutting wheel is connected from a motor to an adjustable holding device by a flexible shaft so that the holding device which is attached to the frame may be adjusted freely to align the cutting wheel against the tire at a desired location for cutting an annular groove in the tires. The clamp may then be used to remove the cutting wheel away from the tire and act as a brace for a liquid applicator for applying liquid rubber or the like to partially fill the annular groove. The frame will of course have a handle for lifting and a connection for the electric motors and at least one switch for one of the motors.

BRIEF DESCRIPTION OF THE DRAWINGS

Other objects, features and advantages of this invention will be apparent from a study of the written description and the drawings in which.

DESCRIPTION OF THE PREFERRED EMBODIMENTS

Figure 1:
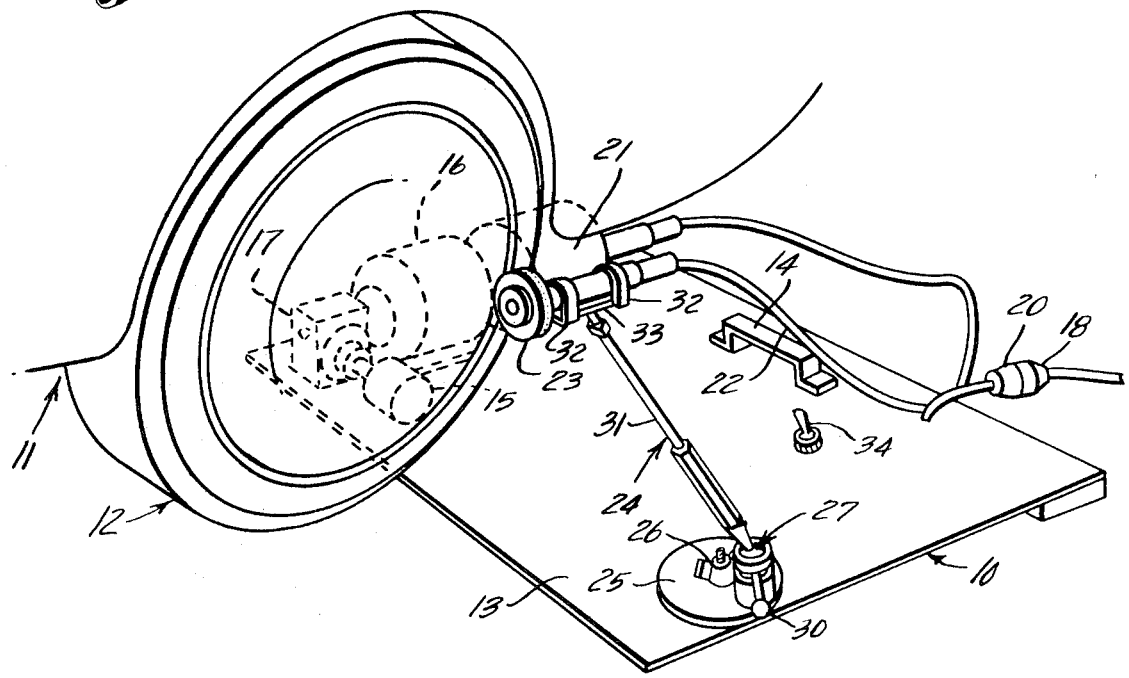
FIG. 1 is a perspective of a first embodiment of the present invention in operation against a tire.

FIG. 1 shows the present invention 10 next to an automobile section 11 having a tire 12. A frame 13 may be made of heavy aluminum, steel or any other material with sufficient strength and has a handle 14 attached to it for moving the apparatus from place to place. The tire 12 has been lifted slightly off the ground by means of a jack or the like and the frame pushed so as to place a roller 15 firmly against the tire 12. Roller 15 which may be made of hard rubber or the like is driven by an electric motor 16 which drives an elbow drive or gear 17 for driving a shaft to drive the roller 15. When an AC line 18 is connected to plug 20 the motor 16 starts into operation and drives roller 15 to rotate tire 12. It should be pointed out that motor 16 could be arranged so that gear drive 17 would not be needed without departing from the scope of the present invention. An electric motor 21 drives a flexible drive shaft 22 having a grinding wheel or other cutting device 23 which is clamped onto an adjustable holding fixture 24 having a plate 25 fastened to the frame 13 with a wingnut 26 which may be loosened for rotation of the plate 25 on the frame 13. A locking ball joint 27 is movably attached to the plate 25 so that rotation of plate 25 moves joint 27 around similar to an eccentric. The locking ball joint 27 has a ball 28 which is locked by turning a handle 30 which screws a washer tight against the ball 28. This joint 28 which is commercially available allows adjustment of arm 31 in any direction that the ball 28 may be turned and provides a convenient way to lock the arm 31 in the desired position. Clamps 32 hold the shaft 22 onto a bar 33 connected to arm 31. Thus the cutting wheel 23 may be conveniently located against tire 12 by rotating plate 25 and adjusting the ball joint 27 and locking each in place. An annular groove will thus be cut into the side of the tire as soon as motor 21 is activated by switch 34. Once the groove is cut, the handle 30 is moved to loosen the ball 28 and the arm 31 is moved back away from the tire slightly and may then act as a brace to hold an applicator for applying liquid rubber or the like to the groove cut in the tire.

Figure 2:
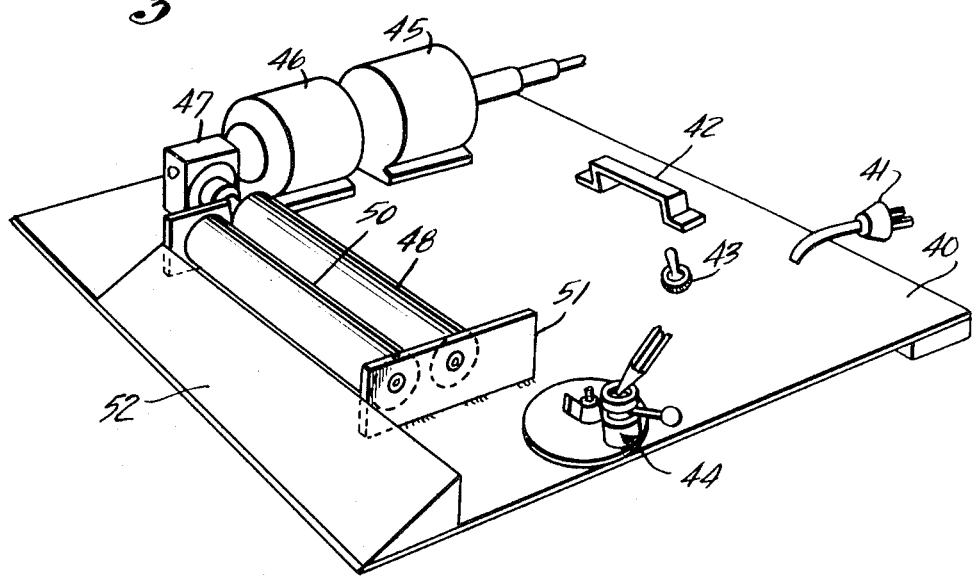
FIG. 2 is a perspective of a second embodiment of the invention.

Referring now to FIG. 2, a second embodiment is shown there having a frame 40 with a plug 41, handle 42 and a switch 43. A locking multiple adjusting holding device 44 is the same as in FIG. 1 and is only partially shown here while the cutting wheel and flexible shaft are also the same and not here illustrated. This embodiment has two motors 45 and 46 and an elbow gearing arrangement 47, all similar to the embodiment of FIG. 1. This embodiment, however, differs in that two extended rollers 48 and 50 are provided and connected to a bracket 51. Roller 48 is power driven while roller 50 is free rolling. A small ramp 52 is provided parallel and on one of the longitudinal sides of the rollers so that a vehicle tire may be driven up the ramp 52 onto the top of rollers 48 and 50. In this manner a jack is not needed and rotation of roller 48 will rotate a tire thereupon. This embodiment is in all other respects like the one in FIG. 1.

As can be seen an apparatus has been provided for the easy, economical, yet speedy means of cutting an accurate groove in a vehicle tire without removing the tire from the vehicle.

This invention is not to be construed as limited to the particular forms disclosed herein, since these are to be regarded as illustrative rather than restrictive.

I claim:

1. An apparatus for adding colored sidewalls to vehicle tires while the tires remain on a vehicle comprising in combination:
   a. a frame;
   b. tire rotating means attached to said frame for rotating a vehicle tire on a vehicle when placed thereagainst;
   c. rotatable cutting means driven by an electric motor and adapted to be positioned against one side of said tire for removing material in an annular groove around said tire;
   d. adjustable holding means attached to said frame and movably attached to and holding said cutting means and adapted for positioning and holding said cutting means; and
   e. said adjustable holding means including a locking ball joint for locating said cutting means against the side of said tire; whereby an annular groove may be cut in one side of said tire for receiving coloring material.

2. The apparatus according to claim 1 in which said rotatable cutting means includes a grinding wheel connected to said electric motor by a flexible shaft.

3. The apparatus according to claim 2 in which said tire rotating means includes an electric motor driving at least one roller.

4. The apparatus according to claim 3 in which said tire rotating means includes a pair of side by side rollers whereby said vehicle tire can be positioned upon said rollers for rotation of said tire.

5. The apparatus according to claim 4 but including a ramp means attached to said frame for said tire to be driven over and onto said rollers.

6. The apparatus according to claim 1 in which said adjustable holding means includes a rotatable eccentric mount on said frame.